(12) United States Patent
Silfverhuth

(10) Patent No.: US 9,027,704 B2
(45) Date of Patent: May 12, 2015

(54) COATING AND ITS MANUFACTURING PROCESS

(75) Inventor: Esa Silfverhuth, Vantaa (FI)

(73) Assignee: Lumir Oy, Helsinki (FI)

( * ) Notice: Subject to any disclaimer, the term of this patent is extended or adjusted under 35 U.S.C. 154(b) by 0 days.

(21) Appl. No.: 13/979,599

(22) PCT Filed: Jan. 12, 2012

(86) PCT No.: PCT/FI2012/050024
§ 371 (c)(1),
(2), (4) Date: Sep. 19, 2013

(87) PCT Pub. No.: WO2012/095562
PCT Pub. Date: Jul. 19, 2012

(65) Prior Publication Data
US 2014/0000981 A1 Jan. 2, 2014

(30) Foreign Application Priority Data
Jan. 12, 2011 (FI) ..................... 20115032

(51) Int. Cl.
| | |
|---|---|
| E04B 1/86 | (2006.01) |
| C08K 3/38 | (2006.01) |
| E04B 1/82 | (2006.01) |
| C09D 7/12 | (2006.01) |
| C09D 101/28 | (2006.01) |
| C09D 123/06 | (2006.01) |
| E04F 15/18 | (2006.01) |
| E04F 15/20 | (2006.01) |
| E04B 1/84 | (2006.01) |
| C08K 7/02 | (2006.01) |
| C08K 7/22 | (2006.01) |

(52) U.S. Cl.
CPC ... *C08K 3/38* (2013.01); *E04B 1/82* (2013.01); *E04B 1/86* (2013.01); *E04B 2001/8461* (2013.01); *C09D 7/1283* (2013.01); *C09D 7/1291* (2013.01); *C08K 7/02* (2013.01); *C08K 7/22* (2013.01); *C09D 101/286* (2013.01); *C09D 123/06* (2013.01); *E04F 15/181* (2013.01); *E04F 15/203* (2013.01); *E04F 15/206* (2013.01)

(58) Field of Classification Search
CPC .......................................................... E04B 1/86
USPC .................................................. 181/290, 284
See application file for complete search history.

(56) References Cited

U.S. PATENT DOCUMENTS

| | | | |
|---|---|---|---|
| 5,034,160 A * | 7/1991 | Kindt et al. .................. | 252/604 |
| 5,620,509 A | 4/1997 | Tampio | |

(Continued)

FOREIGN PATENT DOCUMENTS

| | | |
|---|---|---|
| FI | 20100401 | 5/2012 |
| WO | WO 96/16804 A1 | 6/1996 |

(Continued)

*Primary Examiner* — Forrest M Phillips
(74) *Attorney, Agent, or Firm* — Muncy, Geissler, Olds & Lowe, P.C.

(57) ABSTRACT

A coating composition has a natural fiber-bearing dry matter mixture, as well as cellular plastic grains, mixed into water. By spreading this composition onto any base, particularly by spraying, and by hardening it, particularly through drying, the coating is formed from the coating composition, which coating provides extremely good acoustic properties. If a special fiber base plate based on chemical pulp is used as the base of the coating, the plate-like acoustic element is obtained.

26 Claims, 3 Drawing Sheets

(56) References Cited

U.S. PATENT DOCUMENTS

| | | | |
|---|---|---|---|
| 6,290,021 B1 * | 9/2001 | Strandgaard | 181/290 |
| 7,205,043 B1 * | 4/2007 | Spero et al. | 428/292.1 |
| 7,600,609 B2 * | 10/2009 | Nakamura | 181/290 |
| 7,980,358 B2 * | 7/2011 | Soltau et al. | 181/286 |
| 2003/0178250 A1 * | 9/2003 | Putt et al. | 181/290 |

FOREIGN PATENT DOCUMENTS

| | | |
|---|---|---|
| WO | WO 99/13022 | 3/1999 |
| WO | WO 03/044302 A1 | 5/2003 |
| WO | WO 2004/083146 A2 | 9/2004 |
| WO | WO 2007/063178 A1 | 6/2007 |

* cited by examiner

COATING AND ITS MANUFACTURING PROCESS

FIELD OF THE INVENTION

The object of the present invention is a coating to be used for improving acoustic properties, a coating composition which is suitable for this purpose, an acoustic element formed by means of the coating, and methods for manufacturing the same.

DESCRIPTION OF PRIOR ART

When planning and implementing structures, more and more attention is paid to the acoustics of rooms, offices and other spaces. Naturally, functioning acoustics are a prerequisite, for example, in concert halls, but, the acoustics also have significant impacts on the levels of satisfaction, work efficiency, and even human health, for example, in homes, schools, and workplaces. Since structural solutions cannot be selected on the terms of acoustics alone, different acoustic elements or acoustic surfaces, which are installed in the spaces and on their surfaces after the actual construction stage, are needed.

Consequently, more attention than before is paid to noise levels, i.e., sound absorption in the vicinity of machines that are running.

A primary requirement for the functioning of the acoustic surface or element, naturally, is that it has suitable acoustic properties. Generally, this signifies a sound absorption that is sufficiently strong or has a frequency response of a suitable form. On one hand, since the acoustic elements and surfaces are structures that remain in sight, their architectural image should also be suitable for their environment and the other surfaces of the space. The thickness of the panel or surface should remain within reasonable limits, which, on the other hand, is inconsistent with the high requirement of sound absorption. Naturally, the acoustic elements or surfaces should also fulfil the criteria of purity which is set for the surface materials of interiors, and they should also have mechanical and physical properties that are suitable for their environment of use. Similarly to other structural elements, the requirement of considering environmental aspects, to an increasing extent, also applies to the acoustic surfaces and elements with respect to the manufacture and recyclability of the materials, for example.

The most common commercially available, ready-made acoustic elements include mineral wool-based (fibreglass or rock wool-based) acoustic panels. On the sides of these which remain in sight, the surface of the mineral wool is coated, for example, with paper, plastic, fabric or glass fleece. Being relatively light components, these acoustic elements, which are based on insulating wool panels, are simple to install, for example, on the ceiling or walls of the space that is to be provided with sound absorption, either as separate elements or as an unbroken surface. They can also be formed into acoustic planes that are lowered down from the ceiling, for example.

The wool panel of known solutions should also be properly covered on the surfaces of its edges, both due to its appearance and to prevent any mineral dust from coming off into the surrounding space. With time, the seams of these panels will darken and, thus, become visible. A film coating is therefore not sufficient, but, in practise, in the case of separate acoustic elements, this typically means cover strips or the like, which complicate the manufacture and installation of the element and increase the costs.

The sound absorption ability of mineral wool is moderate, but at low frequencies, in particular, sufficiently efficient absorption may require an impractically thick panel. For the absorption of the highest range of sound, relatively thin layers are sufficient. For the absorption of medium high and low ranges of sound, however, fairly thick layers are needed. In conventional cases, absorption structures with a thickness of about 50 mm are functional, but in demanding objects, layers of over 100 mm in thickness may be needed. With mineral wool, it is also difficult to meet all of the demands made by the ecological aspect, which are often considered to be important these days.

For the coating of walls, ceilings or the like in different interiors, various fibre-based coating compounds are also known, which are sprayed or applied in another way and which provide a mechanical surface structure that is more elastic and durable than glass and rock-based coatings, and which can also contribute to the acoustics of the premises.

For example, the specifications FI 95041 and WO 2007/063178 disclose natural fibre-based coatings that are sprayed when mixed with water, or applied in a similar manner and hardened through drying. The fibre of the coating compound of the specification FI 95041 comprises fine cellulose fibre. In the solution of the specification WO2007/063178, in addition to the fibre material and the binder, the compound includes particle-like, typically mineral-based fillers, by means of which the surface of the coating becomes smooth and which can adjust the acoustic properties of the coating.

The known solutions have their limitations, regarding the acoustic properties, in particular. When the sound absorption is to be improved, the thickness of the coating should be increased. In addition to the adverse aspects of appearance, among others, this increases the mass of the coating per unit area and impairs the ability to maintain its position. A more effective sound absorption, with the said adverse effects remaining smaller, is achieved by acoustic elements, wherein the coating is sprayed on top of the insulating wool panel, for example. When the insulating panel constitutes part of the sound absorption, the coating as such can be relatively thin. In any case, however, it is not desirable to use a separate acoustic element; hence, there exists a need for a coating compound that is sprayed, which after drying, as such, forms a layer of sound absorption on any base to be coated, which is more effective than the known solutions.

BRIEF DESCRIPTION OF THE INVENTION

The purpose of the invention is to disclose a coating that improves the acoustic properties of premises and reduces the drawbacks of the known solutions.

Particularly, the purpose of the invention is to provide a fireproof coating and, optionally, an acoustic element which is formed by the means of the same, by utilising a coating composition which is particularly suitable for the purpose and which provides effective sound absorption, good thermal properties, and from which no significant amounts of dust or other particles come off, even after drying.

The basis for the invention is to produce a coating solution that has excellent acoustic and thermal properties. Such a coating could be used, for example, in structural or interior solutions, or even on the surfaces of machine spaces, such as the engine bonnets of cars.

Thus, the invention relates to a coating composition which comprises a natural fibre-bearing dry matter mixture mixed with water, and from which a light, fixed, and durable coating can be formed on any base.

The coating composition according to the invention comprises a fibre-bearing dry matter mixture that is mixed with water. Fibre-bearing means that the basic material of the dry matter mixture comprises a fibre or some fibres, as distinct from the rock material based on cement or the like, for example. In the dry matter mixture, the fibres are preferably ground into an extremely fine substance. In addition to the fibre material, the coating composition preferably comprises at least one binder. To provide a smooth and loose coating composition, a foaming agent can also be added to the coating composition. The coating composition is preferably manufactured by mixing all of the dry ingredients together into the dry matter mixture and by then mixing the dry matter mixture with water. It is, however, also possible to add to the coating composition any ingredient(s) of the dry matter mixture or part of such another dry ingredient separately.

The coating composition according to the invention is characterised by what is presented in the characterizing part of claim 1, and the coating which is formed from this coating composition is characterised by what is presented in the characterising part of claim 9.

Correspondingly, the acoustic element which is formed by means of the coating according to the invention is characterised by what is presented in the characterising part of claim 13.

The method of manufacturing the coating, according to the invention, is characterised by what is presented in the characterising part of claim 11, the method of manufacturing the acoustic element is characterised by what is presented in the characterising part of claim 20, and the use of the latter method is characterised by what is presented in claim 26.

The invention provides numerous significant advantages in comparison with the known solutions. The actual coating, when used as such on top of any base in any space, can provide the space with extremely good acoustic properties. These properties of the coating alone, at the very least, correspond to the acoustic properties that are achieved by means of the conventional acoustowool panel, or are even better. The coating also meets the requirements of sustainability, with respect to both the manufacture and the actual product and its recyclability.

No mineral dust that may irritate breathing and the skin comes off the cellulose wool panel that is optionally used as part of the acoustic element. In particular, when made from bleached chemical pulp fibre, in terms of its appearance, it is also compatible as such with the coating and most interior decoration surfaces. Consequently, the cellulose wool panel does not necessarily need to be encapsulated or covered at its edges (as is the case with elements that are based on mineral wool panels, wherein, both the appearance and the mineral dust require an overall covering or closing of the structure). This simplifies the manufacturing method of the acoustic element, thus also influencing the manufacturing costs. The appearance of the surface of the acoustic element that remains in sight is easy to adjust by means of the colour or surface structure of the coating. For example, regarding the colour, the production of the elements does not need to be limited to specific colour standards, but, by adding conventional colouring agents to the coating composition, for example, right before its application, any colour of the known colour charts can be implemented.

When it comes to an acoustic element, the acoustic properties of the element are, of course, of vital importance. Also in this regard, the invention offers significant advantages. The thickness of the cellulose wool panel can be thinner than the mineral wool-based structure. In addition to the appearance, due to its light weight, the thin structure also facilitates the attachment of the element, improves its adhesion and, as necessary, facilitates its transferral.

Another advantage of the cellulose wool-based acoustic element is its ability to bind and release moisture, which may help balance the variations in the humidity of the space, as a large acoustic surface consisting of several elements, in particular.

One important property of the structures that function, e.g., as part of interior design, such as the acoustic element, is fire safety. Both the coating, according to the invention, and the base plate of the acoustic element, according to the invention, can employ fire retardants known per se, such as boron-based substances, whereby even fairly high fire safety requirements can be met.

Stiffening by the forming fibre, such as thermal fibre that is optionally used in the acoustic elements, according to the invention, in turn, makes the wool panel easier to cut and improves its processability. At the same time, its low melting point saves heating energy.

The method according to the invention can be used, firstly, for influencing the appearance of the coated base in a fairly versatile manner. The colour of the coating can be adjusted, as desired, by adding colouring agents to the coating composition. The manner of applying the coating composition, in turn, can influence the surface structure of the finished coating. For example, by spreading the composition by spraying, coatings made by the gunning of concrete can be simulated, whereby the surface of the base becomes compatible with plastered surfaces. According to the exact composition and other properties, such as the thickness of the coating, it is also possible to more extensively influence the acoustic properties of the element, in comparison with the use of paper, fabric or the like.

One significant advantage of the coatings, according to the invention, is that, by means of them, acoustic surfaces with a uniform appearance can be formed without visible seams. Also in the cases, where the coating is formed on the surface of separate base plates that are installed side by side, coatings with a uniform appearance can be produced. Compared with, for example, cement-based coatings, the coating that is based on natural fibre, such as cotton fibre, is typically also more elastic and, thus, less prone to break.

The cellular plastic granules in the coating composition function as filler, which allows the thickness of the coating to be increased without adversely increasing its mass per area unit. In that case, also the largest possible layer thickness of the coating increases. The coating composition, according to the invention, can be used, for example, for implementing coatings of a thickness of over 20 mm, whereas the largest possible thickness of typical coating compositions, according to the prior art, can be below 10 mm. Naturally, a thicker coating absorbs sound more effectively than a thin one. Furthermore, cellular plastic also contributes to enhancing the sound absorption.

Cellular plastic granules also bring advantages to the manufacture of the coating composition. For example, the amount of water needed for the coating composition does now grow in relation to the thickness, compared with the solutions according to the prior art, since the cellular plastic itself absorbs no water. This both facilitates the manufacture and application of the coating composition and accelerates the drying of the coating.

The other details and advantages of the invention are disclosed in the following detailed description and the appended drawings.

DETAILED DESCRIPTION OF THE PREFERRED EMBODIMENTS OF THE INVENTION

Figure 1:
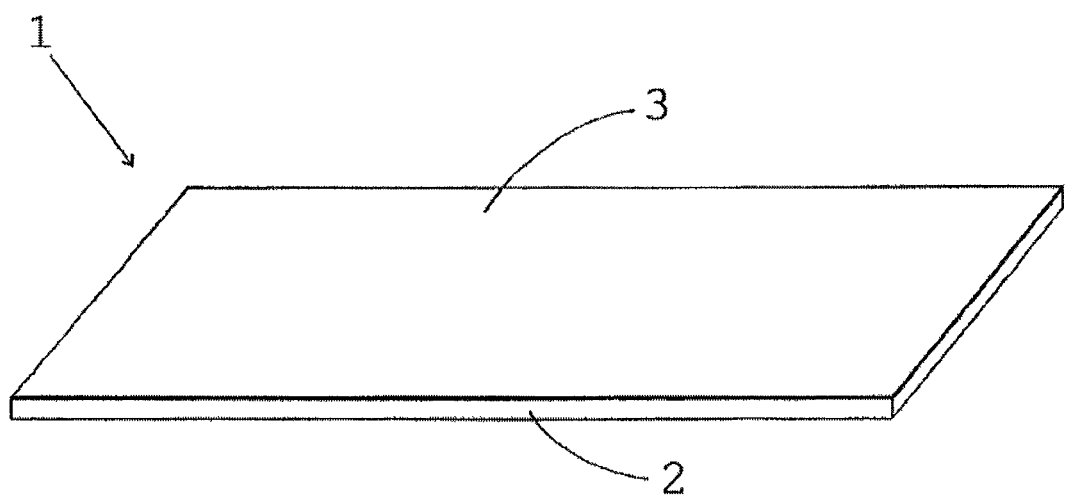
FIG. 1 is a basic figure of the structure of the acoustic element, according to the invention.

The present invention relates to a coating composition which comprises a natural fibre-bearing dry matter mixture, mixed with water, and cellular plastic grains.

Generally, this coating composition is manufactured by mixing the dry matter mixture with water, optionally, by foaming it to remove the surface tension and, finally, by an optional further mixing.

By spreading this composition on any base by spraying, in particular, and by hardening it through drying, in particular, the coating according to the invention can be formed from the coating composition, and one or more layers of the coating can be provided on the base.

The coating can be of any colour. It is preferably matched to the surroundings of the final use of the coating by means of the colouring agents that are added at the manufacturing stage of the coating composition. Its surface can either be essentially even, or it can be rendered uneven, like in the gunning of concrete, for example.

The base can be comprised of a special wallboard, such as a plaster board or fibre board, or the coating composition can be sprayed directly onto the inner wall of the space, onto the surface of the ceiling, onto the surface of a pipe or onto another base, such as a metal base. Therefore, the base can also be comprised of difficult surfaces, such as curved surfaces, concrete walls, and metal-sheeted roofs.

The fibre of the coating composition, according to the invention, is vegetable fibre, such cellulose, flax, cotton, or hemp fibre, or animal-based fibre, such as silk or wool-based fibre, or a mixture of such fibres, and this composition consists of dry ingredients that are mixed with water, which in addition to the said fibre, preferably contain a binder, such as carboxy-methyl cellulose, hydroxypropyl cellulose or methyl cellulose or a derivative thereof, preferably carboxy-methyl cellulose, and possibly, additives, such as a colouring agent, fire retardant, anti-rot agent, a substance that increases the strength or a substance that influences the sound-absorption, or two or more of such substances.

Typically, the dry matter content of the coating composition is over 10% by weight, preferably about 15-35% by weight. The amount of binder is, typically, 1-30% by weight, especially 3-15% by weight, preferably 3-11% by weight from the fibres. The dry matter content of the composition that is mixed with water is over 10% by weight, preferably 12-25% by weight, most preferably 15-20% by weight.

The fire retardant and anti-rot agent are preferably comprised of a boron-based substance, such as boric acid or borax or a mixture thereof, hydroxides, such as aluminium or magnesium hydroxide or a mixture thereof, or absorbing substances, such as talc or calcium carbonate or a mixture thereof, most preferably boric acid or borax, particularly, a mixture thereof, in an amount of 8-25% by weight from the dry matter. When a mixture of boric acid and borax is used, their proportion in the said mixture is, generally, between 80:20-20:80, preferably between 60:40-40:60, more preferably about 50:50, calculated according to the weight. One good, useful alternative as such a protective agent, in exploiting the present invention, is described in the specification FI 110869.

According to a preferred embodiment of the invention, the coating composition comprises 10-80% of mineral filler from its dry matter mass, preferably mineral silicate, mineral sulphate or mineral carbonate, most preferably kaolin. Kaolin is a fine powdery clay mineral, which can be used in the coating composition that is mixed with water for influencing the fire resistance, strength and acoustic properties of the structure that is coated. One especially advantageous fact that has been observed is that the content of kaolin can influence the frequency response of the sound-absorption of the coating and, thus, the structures of the entire space.

According to a second preferred embodiment of the invention, the relative frequency response or the shape of the frequency response of the sound absorption of the structure that is to be coated, such as the acoustic element, is adapted to a predetermined frequency response by means of the mineral filler content of the coating composition. For example, the higher the content of kaolin, the weaker the absorption of higher frequencies and the more effective the absorption of lower frequencies, respectively.

The coating composition according to the invention essentially differs, for example, from non-woven fabrics or the like, the material of which can also comprise natural fibre and binder, so that the coating composition of the invention forms a solid-state, yet porous coating.

Surprisingly, the cellular plastic grains contained in the coating composition provide an advantageous means of considerably improving the mechanical and acoustic properties of the coating that is manufactured by means of the natural fibre-bearing coating composition. In addition to enhancing the sound absorption, the cellular plastic grains can also be used for flexibly adjusting the frequency response of the sound absorption.

"Cellular plastic" herein, generally, refers to plastic that is made by foaming or in another way, its inner structure consisting of adjacent cells. Both soft, flexible, and stiff cellular plastics are known, and the grade used in the invention can be any of these. "Grains", in turn, are essentially spherical components of a specific size. In the present invention, cellular plastics are used, among others, for lightening the coating composition or the acoustic element.

The average diameter of the cellular plastic grains is 1-5 mm. As the thickness of the coating is, typically, between 5-25 mm, grains of this size are small enough to be evenly distributed in the coating. On the other hand, the participation of unacceptably small grains, for example, in the sound absorption is not very effective.

The cellular plastic grains preferably comprise 20-90%, more preferably 40-90%, most preferably 70-90% from the weight of the dry matter, whereby mainly the fibres are replaced with them. It has been observed that the portion within this range is best in maintaining the advantages that are achieved using the fibre base, and yet it effectively improves the properties of the coating in the manners mentioned above. The portion that produces the best end result also depends on the type(s) and size distribution of the cellular plastic grains that are used.

The cellular plastics come in closed-cell and open-cell types. The cellular plastic is closed-cell plastic, when the cells are closed and each one forms its own closed space. Correspondingly, the cellular plastic is open-cell plastic, if the cells are partly open, so that several cells form a shared space. In the coating composition, according to the invention, preferably at least part of the cellular plastic grains consists of closed-cell material. As an end result, the closed-cell grains, which do not transmit acoustic waves like the open-cell ones do, produce a coating structure that effectively attenuates sound at low frequencies, in particular. Neither can water be absorbed into the closed-cell structure, which improves the moisture resistance of the coating.

The quality and size of the cellular plastic grains and their portion of the dry matter mixture are most suitably adapted to the predetermined acoustic properties of the coating. The adjustability of the acoustic properties is a significant advantage of the invention. The dependence of the acoustic properties on the relative portions of the various cellular plastic grades and on the overall portion of cellular plastic in the dry matter mixture can be determined by measurements. The respective composition of the dry matter mixture can, then, be selected so as to match the desired acoustic properties on the basis of the previous measurement results.

The coating composition that contains cellular plastic grains can be manufactured, for example, by first grinding the fibres into as fine powder as possible. After this, carboxy-methyl cellulose, hydroxypropyl cellulose or methylcellulose or a derivative thereof, preferably carboxy-methyl cellulose, and cellular plastic grains are mixed with the fibre material to constitute the binder, so that the cellular plastic comprises a total of 20-90% from the weight of the dry matter. At least part of the cellular plastic grains is comprised of closed-cell cellular plastic, preferably 30-80% by weight, more preferably 40-70% by weight. The amounts of closed- and open-cell materials used are preferably equal. Generally speaking, their proportion can be adjusted in accordance with the desired acoustic properties of the coating. Next, the dry matter mixture is mixed with water, so that a uniform coating composition is formed. Optionally, the composition is foamed, and, possibly, one or more additives are added, such as a fire retardant or an anti-mould agent or both, whereafter it is ready to be sprayed to its final application.

In the manufacture of the coating according to the invention, for example, the equipment described in the patent specification WO 2007/063178 can also be used. The coating composition similar to the one described above, which is sprayed to its application, forms, after drying, a coating that is extremely effective in absorbing sound. Even a coating with a thickness of 25 mm, according to the invention, provides a sound absorption that corresponds to a mineral wool panel-based acoustic element of up to 30 mm, the sound absorption, however, varying according to the frequency of the sound. The coating composition, according to the invention, is also effective in absorbing sound at low frequencies, where the absorption in the case of wool panels requires an especially large panel thickness.

In the method of forming the coating, the coating composition is spread to its application, for example, by spraying, with a roller or spatula, preferably by spraying. If spraying is used for the spreading, the coating composition to be sprayed is constantly agitated during the spraying, preferably as effectively as possible to render the coating essentially homogeneous. If the surface is to be smooth, the coating is, optionally, evened out after the spreading. Due to the hardening that is carried out through drying by means of heat, the coating composition preferably forms a firm coating, which is yet more flexible and light-weight than rock-based coatings and effective in absorbing sound.

According to a preferred embodiment of the invention, the coating composition is spread to its application in two or more layers, preferably in 2-5 layers, which are separately hardened after an optional levelling before the next layer is applied.

The present invention also relates to a plate-like acoustic element, which is formed by means of the said coating. This element comprises a fibre-based base plate that has a natural fibre-bearing coating spread at least on one side thereof, and the manufacturing method of such an acoustic element.

The plate-like acoustic element 1, according to the invention, comprises (see FIG. 1)
2 a base plate, and
3 a coating Thus, the base of the acoustic element 1 is comprised of a plate 2, which consists of fibre-based fibre board, preferably chemical pulp fibre-based, which herein means that over 50%, preferably 75-100% of the fibre material is fibre, preferably chemical pulp fibre. The fibre can be new or recycled fibre. On the surface of this base plate 2, one or more layers of natural fibre-based coating 3 are formed, whereby when using several layers, the coating in question can be a coating 3 with the same composition in all of the layers, or coatings 3 that are produced from different compositions. To achieve uniformity, several coating layers are, however, preferably produced from the same composition.

In the manufacturing method of the element 1, according to the invention, the coating 3 is formed on the base plate 2 by spreading the aqueous coating composition onto the surface of the base plate 2, at least on one side of the base plate 2, preferably on both sides of the base plate 2 or, optionally, even on its edges, and the composition is allowed to harden through drying.

The base plate 2 that functions as the base of coating 3 is preferably cellulose wool-based and contains a binder, which is preferably refiner groundwood, crushed plastic or thermal fibre that also functions as the stiffener of wool, most preferably polyethylene or another thermal fibre of a relatively low melting point. Thermal fibre refers to fibre, which can be melted by heating and which re-solidifies below the melting point. The melting point of polyethylene, which is a preferable alternative thermal fibre, is about 95° C. The low melting point saves heating energy. In the manufacturing process of the base plate 2, the hardening of the plate 2 into a desired thickness and shape can be facilitated by means of the thermal fibre. Hardening by the thermal fibre also makes the plate 2 easier to cut and improves its processability.

Figure 2:
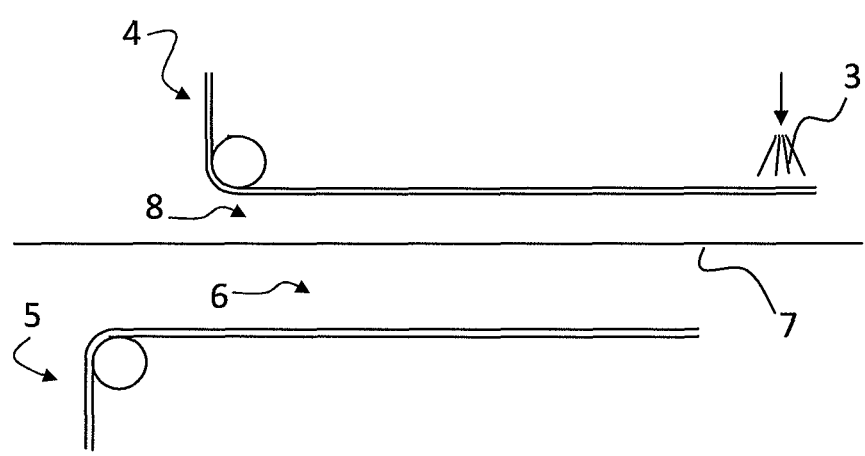
FIG. 2 is a basic figure of the structure and formation of the base plate, according to one preferred embodiment of the invention.

According to a preferred embodiment of the invention, the base plate 2 is formed from several layers (see FIG. 2), wherein, between the binding layers 4, 5, such as felt layers, there are provided one or more binding fibre layers 6, which preferably consist of refiner groundwood, one or more layers 7 of a soundproof material, such as plastic film, preferably nano plastic film, and one or more additive fibre layers 8, which preferably consist of cellulose wool. There is most preferably one of each of the said layers, whereby the soundproof layer 7 is the middlemost. The amounts of material used in the layers and, hence, the thickness of the layers, can be varied. The thickness of each fibre layer is preferably 2-10 mm per layer; there is more preferably an essentially equal amount of each fibre layer, whereas the thickness of the soundproof layer is preferably on a nano scale, preferably 10-100 nm. The coating 3, according to the invention, can also be formed, on the surface of such a base plate 2, for example, by spraying, as illustrated in FIG. 2.

In the acoustic element 1, according to the invention, at least on one surface of plate 2, which remains in sight when installed in its use, a porous coating 3, according to the invention, is spread, which is prepared from the composition described above. Similarly to the wool panel, the colour of the coating 3 can be white, or it can be adapted to the coating composition, according to the environment of the location of the acoustic element 1, by means of the colouring agents that are added at the manufacturing stage thereof. Hence, the colour of the base plate 2 is not defined. The surface of the coating 3 can be essentially smooth, but the coating can also be applied by spraying, whereby the surface structure can be uneven, similarly to the gunning of concrete.

The acoustic element 1 that is made from such layers can be installed directly to the wall or ceiling surface of the space that is to be made acoustic, for example, by gluing. No additional framework or casings are needed. The acoustic element 1 can also be installed separately from the wall or ceiling surface, which installation method can influence the sound absorption provided by the element. The acoustic elements 1 can be used as single panels of a desired size or several of them can be installed side by side to form a continuous acoustic surface. Acoustic elements that are installed separately from the ceiling and next to each other can be formed, for example, into a suspended ceiling or a ceiling that is lowered.

The method of manufacturing the plate-like acoustic element 1 comprises stages, wherein, optionally, fibre pulp that contains at least fibre is first formed for the manufacture of the base plate 2. Another alternative is to use panels that are on the market. Correspondingly, the coating composition is formed by mixing, with water, a dry matter mixture comprising fine-grained natural fibre, such as cotton, binder and, optionally, mineral filler or cellular plastic grains or both. The aqueous coating composition thus formed is spread onto the surface of the base plate 2, according to the invention, or a known plate, and the composition is dried to form the hardened coating 3.

The coating composition according to the invention is spread to its application, for example, by spraying, with a roller or a spatula, preferably by spraying. After drying, it forms a firm coating, which is yet more flexible and lightweight than rock-based coatings, and effective in absorbing sound.

The density of the base plate 2 is arranged at 30-100 kg/m$^3$, preferably 40-80 kg/m$^3$, more preferably about 50 kg/m$^3$, and the thickness at about 50 mm maximum, preferably 15-50 mm, most preferably about 30 mm. Correspondingly, the thickness of the coating 3 is arranged at about 70 mm maximum, preferably about 40 mm max., more preferably 5-35 mm, most preferably 15-30 mm.

The base plate 2 according to the invention can be manufactured in the manner described below. This manufacturing method of base plate 2 comprises stages, wherein a base composition that contains base fibre, such as chemical pulp fibre, and base binder, such as thermal fibre, refiner groundwood or crushed plastic is spread into a layer on the base;

the layer formed by the base composition is heated to above the melting point of the base binder, so that the base binder melts;

the layer contained in the melted base binder is compressed into a desired thickness; and while the layer is maintained at the desired thickness by compression, the temperature is allowed to drop below the melting point of the base binder, so that the base binder re-solidifies and binds the layer into a continuous plate 2.

According to a preferred embodiment of the invention, a fire retardant and an anti-rot agent are added to the above-mentioned base composition. For this purpose, the same substances are suitable which are described above in connection with the coating composition. One good alternative for such a protective agent is described in the specification FI 110869.

According to an especially preferred embodiment of the invention, the acoustic element 1 is manufactured so that, in accordance with the stages described above, the plate 2 is manufactured, and the coating composition is spread onto the surface of the base plate 2, while the plate 2 is still at the raised temperature, to exploit the heat that was used in melting the base binder to dry the coating composition. In this way, the heat energy that was used in the manufacturing process of the wool panel can be used in the drying. This saves energy and, thus, further improves the ecological aspect of the manufacturing method, according to the invention, and of the acoustic element produced by the same.

When the coating composition is spread onto the surface of the thus solidified plate 2 or the known plate, and when a smooth surface of the coating 3 is desirable, the coating composition can be evened out before drying. When needed, the finished coated element 1 is cut into elements of a desired size.

In the manufacture of the element 1, according to the invention, the compositions of the base plate 2 and the coating 3, their densities and layer thicknesses are preferably selected according to the predetermined acoustic properties of the acoustic elements. The most important fact is often an adequately strong sound absorption. An absorption structure with the best absorption power is created from fibrous or open-cell materials. The most common of the materials that fulfil this definition are textile felts, mineral wools, and open-cell cellular plastics. An effective absorption can also be achieved at even the lowest ranges of sound by leaving an open airspace between the thinner plate, according to the invention, and the background structure. This requires a separate supporting system on the ceiling surfaces and a suitable additional structure on the walls.

Behind the fairly thin, porous absorption structure, an intermediate structure that functions like airspace can also be made, which as such does not need to consist of a fibrous, sound-absorbing material. This intermediate structure comprises open "air slots" or "air pipes" between the layer, which is made by spraying or another method, and the background structure.

The intermediate structure can be made, for example, by spraying it onto the surface of the background structure. The structure can also be made as a separate plate, whereby the base plate is first made on the production line, the intermediate structure is made on top of it, and the actual fibrous absorption layer is made on the surface.

The advantages of this system include the free selection and method of implementation of the materials of the intermediate structure, an opportunity to vary the absorption by means of the structure of the surface, the simple method of implementation, and a possibility to make the intermediate layer fairly strong.

The method according to the invention provides the advantage, for example, compared to the spreading of the acoustic coating on site, that the coating equipment does not need to be taken to the actual locality of installation but the entire acoustic element can be completed under plant conditions in a controlled manner.

The invention is not limited to the preferred embodiments presented above only, but the invention can freely be implemented within the scope of the claims.

EXAMPLES

The fire resistance of the coating, according to the invention, was studied by means of three different methods (in Examples 1 and 2), and the acoustic properties of the element, according to the invention, were illustrated (in Example 3).

Example 1

Reaction of the Coating in a Fire

The coating according to the invention, which was studied in this example, was cellulose-based and it consisted of a composition that contained polyethylene grains, carboxymethyl cellulose, a mixture of borax and boric acid, and a conventional fire retardant. Of these ingredients, cellulose and the polyethylene-based cellular plastic grains constituted the major part of the dry matter of the composition, so that the portion of cellulose was about 60% by weight and that of grains about 40% by weight.

The coating was formed on a gypsum-based board of a thickness of 13 mm, and the thickness of the coating that was sprayed on top of it ranged between 3-20 mm (the goal: 15 mm).

The reaction of the thus formed elements in fire was studied according to the EN standard 13823:2002, whereby the results of Table 1 were obtained.

TABLE 1

| Quality | Test 1 | Test 2 | Test 3 | Mean value |
|---|---|---|---|---|
| FIGRA$_{0.2MJ}$ (W/s) | 42.7 | 37.6 | 40.7 | 40 |
| FIGRA$_{0.4MJ}$ (W/s) | 42.7 | 34.2 | 34.4 | 37 |
| THR$_{600s}$ (MJ) | 3.2 | 3.1 | 2.6 | 3.0 |
| LFS$_{EDGE\ OF\ SAMPLE}$ | None | None | None | None |
| SMOGRA (m$^2$/s$^2$) | 0.0 | 2.1 | 0.0 | 1 |
| TSP$_{600s}$ (m$^2$) | 45.9 | 54.2 | 45.2 | 48 |
| Flaming drops/particles at 600 s | None | None | None | None |

In these results, FIGRA describes the growth rate of the fire, THR$_{600s}$ the total release of heat during the first 600 seconds of the test, SMOGRA the formation rate of smoke, TSP$_{600s}$ the total formation of smoke during the first 600 seconds of the test, and LFS the lateral spreading of flames.

The results indicate that the fire safety of the element is first-grade. To be more precise, its reaction in fire falls into class B, its smoke formation into class s1, and its formation of flaming drops/particles into class d0.

Example 2

Initiation Sensitivity of the Coating

The coating according to the invention, which was studied in this example, was cellulosebased and it was made from a composition that contained polyethylene grains, carboxymethyl cellulose, a mixture of borax and boric acid, and a conventional fire retardant. Of these ingredients, cellulose and the polyethylene-based cellular plastic grains constituted the major part of the dry matter of the composition, so that the portion of cellulose was about 60% by weight and that of grains about 40% by weight.

The coating was formed on a gypsum-based board of a thickness of 13 mm, and the thickness of the coating that was sprayed on top of it ranged between 4-6 mm (the goal: 15 mm).

The initiation sensitivity of these elements was tested according to the EN ISO standard 11925-2:2002, wherein the surface of the element was subjected to flames for 30 seconds, so that a filter paper was placed under the element, by means of which the formation of burning particles could be observed, whereby the results of Table 2 were obtained.

TABLE 2

| Sample | Ignition of sample* | Ignition of filter paper | Body of flame over 150 mm |
|---|---|---|---|
| 1 ↑ | None | None | None |
| 2 ↑ | None | None | None |
| 3 ↑ | None | None | None |
| 4 → | None | None | None |
| 5 → | None | None | None |
| 6 → | None | None | None |

*Flaming for over 3 seconds

Also these results indicate that the fire safety of the element is first-grade.

Example 3

Acoustic Properties of the Element

Figure 3:
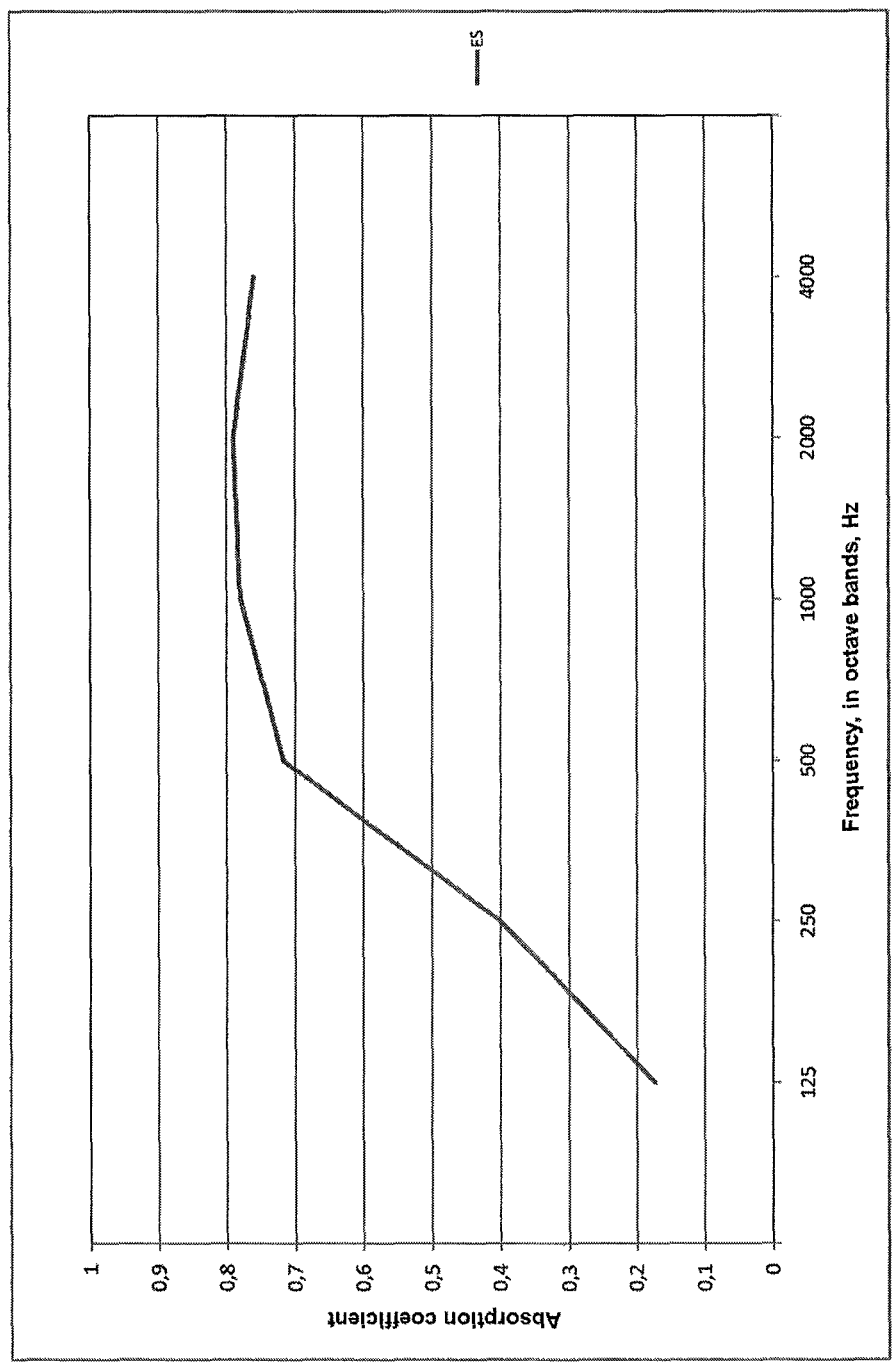
FIG. 3 is a graphical representation of the sound-absorption coefficient of the coating, according to the invention.

The sound-absorption coefficient ($\alpha_S$) of the coating that was prepared from the coating composition, according to the previous examples, was tested according to the ISO standard 354:2003, whereby the results of Table 3 were obtained, which are further illustrated in FIG. 3.

TABLE 3

| Frequency, f [Hz] | $\alpha_S$ |
|---|---|
| 100 | 0.14 |
| 125 | 0.16 |
| 160 | 0.22 |
| 200 | 0.30 |
| 250 | 0.41 |
| 315 | 0.49 |
| 400 | 0.64 |
| 500 | 0.76 |
| 630 | 0.77 |
| 800 | 0.79 |
| 1000 | 0.78 |
| 1250 | 0.77 |
| 1600 | 0.79 |
| 2000 | 0.82 |
| 2500 | 0.76 |
| 3150 | 0.73 |
| 4000 | 0.75 |
| 5000 | 0.80 |

On the basis of these results, the acoustic properties of the element are excellent.

The invention claimed is:

1. A coating composition that comprises a natural fibre-bearing dry matter mixture mixed with water, further comprising cellular plastic grains having an average size of 1-4 mm in a range of 70%-90% of the weight of the dry matter mixture.

2. The coating composition according to claim 1, wherein the fibre is vegetable fibre, animal-based fibre, or a mixture of such fibres.

3. The coating composition according to claim 1, wherein the fibre is vegetable fibre.

4. The coating composition according to claim 1, wherein the fibre is cellulose fibre.

5. The coating composition according to claim 1, wherein at least part of the plastic grains is formed from closed-cell cellular plastic.

6. The coating composition according to claim 1, further comprising 10-80% mineral filler from its dry matter mass.

7. The coating composition according to claim 1, further comprising, as binder, carboxy-methyl cellulose, hydroxypropyl cellulose or methyl cellulose or a derivative thereof.

8. The coating composition according to claim 1, further comprising a fire retardant and an anti-rot agent, selected from a group of boron-based substances, hydroxides or absorbing agents, in a maximum amount of 8-25% by weight of the dry matter.

9. A coating, containing the coating composition according to claim 1, as spread onto a base and dried.

10. The coating according to claim 9, wherein the thickness is up to 70 mm.

11. A method of manufacturing the coating according to claim 9, comprising the stages, wherein a dry matter mixture comprising natural fibre and binder is mixed into water to form the coating composition having a natural fibre-bearing dry matter mixture mixed with water and further having cellular plastic grains, wherein the method comprises spreading the coating composition onto the surface of any base and drying the coating composition to form a hardened coating.

12. The method according to claim 11, wherein by spreading the coating composition onto the surface of the base by spraying, while the coating that is to be sprayed is mixed.

13. A plate-like acoustic element that comprises a base plate, the base plate having one or more layers of coating formed on at least one side thereof, wherein the base plate is fibre-based, and the coating is the fibre-bearing coating according to claim 9.

14. The acoustic element according to claim 13, wherein the material of the base plate is based on chemical pulp fibre.

15. The acoustic element according to claim 13, wherein the base plate is formed from several different layers, wherein, between binding felt layers, there are formed one or more binding fibre layers, one or more layers of a soundproof material, and one or more additional fibre layers.

16. The acoustic element according to claim 13, wherein the base plate and the coating further comprise a fire retardant and an anti-rot agent, selected from a group of boron-based substances, hydroxides, or absorbing agents, in an amount of 8-25% by weight of the dry matter.

17. The acoustic element according to claim 13, wherein the density of the base plate is 30-100 kg/m3.

18. The acoustic element according to claim 13, wherein the thickness of the base plate is 15-50 mm.

19. The acoustic element according to claim 13, wherein the coating is formed by the method wherein a dry matter mixture comprising natural fibre and binder is mixed into water to form the coating composition having a natural fibre-bearing dry matter mixture mixed with water and further having cellular plastic grains, wherein the method comprises spreading the coating composition onto the surface of any base and drying the coating composition to form a hardened coating.

20. A of manufacturing a plate-like acoustic element, comprising stages, wherein a dry matter mixture comprising natural fibre and cellular plastic grains is mixed into water to form the coating composition, wherein the method includes spreading the coating composition onto the surface of a fibre-based base plate and drying the coating composition to form a hardened coating according to claim 9.

21. The method according to claim 20, carrying out the spreading and hardening of the coating composition at least twice to form several layers of coating.

22. The method according to claim 20, manufacturing the base plate according to the stages, wherein
a base composition containing base fibre and base binder, is spread into a layer on a base;
the layer formed by the base composition is heated to above the melting point of the base binder, so that the base binder melts;
the layer contained in the melted base binder is compressed into a desired thickness; and
while the layer is maintained at the desired thickness by compression, the temperature is allowed to drop below the melting point of the base binder, so that the base binder re-solidifies and binds the layer into a continuous plate.

23. The method according to claim 20, spreading the coating composition onto the surface of the base plate while the base plate is still at the raised temperature, to exploit the heat used in the melting of the base binder in drying the coating composition.

24. The method according to claim 20, compressing the base plate into a density of 30-100 kg/m3, preferably 40-80 kg/m3, most suitably about 50 kg/m3, and into a thickness of 15-50 mm, preferably about 30 mm.

25. The method according to claim 20, spreading the coating composition onto the base plate to a maximum thickness of about 70 mm.

26. Use of the method according to claim 20 to adjust the relative frequency response of the sound absorption of the acoustic element to correspond to a predefined frequency response.

* * * * *